(12) United States Patent
Hagino et al.

(10) Patent No.: US 7,023,202 B2
(45) Date of Patent: Apr. 4, 2006

(54) MAGNETIC ROTARY POSITION SENSOR

(75) Inventors: Hiroshi Hagino, Kiryu (JP); Atushi Yamamoto, Kiryu (JP); Takanobu Igarashi, Kiryu (JP); Masahiro Horiguchi, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/901,028

(22) Filed: Jul. 29, 2004

(65) Prior Publication Data

US 2005/0024045 A1 Feb. 3, 2005

(30) Foreign Application Priority Data

Aug. 1, 2003 (JP) ............................. 2003-285194
Sep. 12, 2003 (JP) ............................. 2003-321534
Dec. 24, 2003 (JP) ............................. 2003-426233

(51) Int. Cl.
*G01B 7/30* (2006.01)

(52) U.S. Cl. ............................. 324/207.25; 324/207.2; 324/207.21

(58) Field of Classification Search ..................... None
See application file for complete search history.

(56) References Cited

U.S. PATENT DOCUMENTS 5,544,000 A 8/1996 Suzuki et al.
5,789,917 A 8/1998 Oudet et al.
6,753,681 B1 * 6/2004 Enomoto et al. ...... 324/207.25

FOREIGN PATENT DOCUMENTS

| DE | 100 08 537 A | 9/2001 |
|----|--------------|--------|
| EP | 0 733 881 A | 9/1996 |
| EP | 0 961 100 A | 12/1999 |
| EP | 1 308 692 A | 5/2003 |

* cited by examiner

*Primary Examiner*—Reena Aurora
(74) *Attorney, Agent, or Firm*—Birch, Stewart, Kolasch & Birch, LLP

(57) ABSTRACT

The invention relates to a magnetic rotary position sensor that detects the absolute position of a rotation angle as an electric output in a non-contact state with magneto-electric transducers for converting a magnetic flux variation into a voltage. The magnetic rotary position sensor of the invention includes a cylindrical yoke, semi-cylindrical first and second magnets, and magneto-electric transducers. Here, the first and second magnets are disposed on the inside of the yoke to face to each other, and are magnetized in a manner that the N-pole and S-pole face to each other. The magneto-electric transducers are placed in the magnetic field generated by the first and second magnets, rotate against the first and second magnets, and are disposed at a position to detect the magnetic field in the tangential direction of a circle in which the center of the circle coincides with the center of the yoke and the radius of the circle is equal to or larger than half the outline width of the magneto-electric transducers.

12 Claims, 11 Drawing Sheets

POSITION ON CIRCUMFERENCE

MAGNETIC ROTARY POSITION SENSOR

This Nonprovisional application claims priority under 35 U.S.C. § 119(a) on Patent Application No(s). 2003-285194; 2003-321534 and 2003-426233 filed in Japan on Aug. 1, 2003, Sep. 12, 2003 and Dec. 24, 2003 respectively, the entire contents of which are hereby incorporated by reference.

BACKGROUND OF THE INVENTION

1. Field of the Invention

The present invention relates to a magnetic rotary position sensor that detects the absolute position of a rotation angle as an electric output in the non-contact state with a magneto-electric transducer for converting a magnetic flux variation into a voltage.

2. Description of the Prior Art

A typical method in the conventional magnetic rotary position sensor converts the variation of a mechanical rotation angle into the variation of a magnetic field, detects the variation of the magnetic field by means of a magnetic sensor using a magneto-electric transducer such as a Hall-effect sensor, and thereby detects the variation of the rotation angle in the non-contact state.

However in this magnetic rotary position sensor, the relation between the rotation angle and the output voltage becomes sinusoidal in principle. Accordingly, the angular range in which the output voltage varies approximately linearly to the rotation angle is limited very narrowly.

SUMMARY OF THE INVENTION

The present invention intends to provide a magnetic rotary position sensor having a small error of detection over a wide range of the rotation angle.

According to one aspect of the invention, the magnetic rotary position sensor includes a cylindrical yoke, first and second magnets, and magneto-electric transducers. Here, the first and second magnets are mounted on the inside of the yoke semi-cylindrically to face to each other, and are magnetized in the N-pole and S-pole to face to each other. The magneto-electric transducers are placed in the magnetic field generated by the first and second magnets to rotate against the first and second magnets, and are disposed at a position to detect the magnetic field in the tangential direction of a circle in which the center of the circle coincides with the center of the yoke and the radius of the circle is equal to or larger than half the outline width of the magneto-electric transducers.

This magnetic rotary position sensor reduces the error of detection over a wide range of the rotation angle, and will not generate the hysteresis in principle, because it does not contain a magnetic material in the space formed by the magnets.

DETAILED DESCRIPTION OF THE INVENTION

Figure 1:
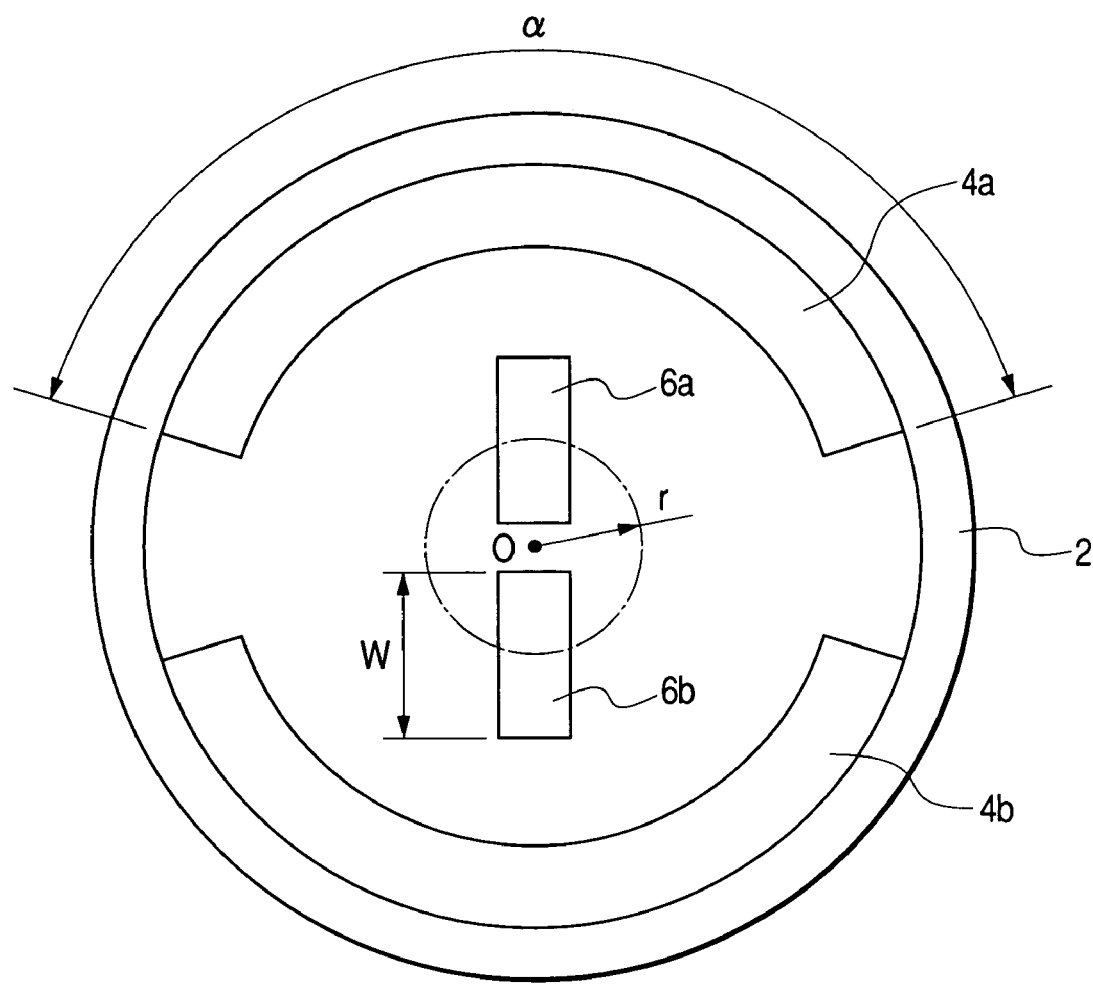
FIG. 1 illustrates a basic construction of a magnetic rotary position sensor of the present invention.

The magnetic rotary position sensor of the present invention will be described with reference to FIG. 1. A cylindrical yoke 2 is made of a soft magnetic material. Semi-cylindrical first and second magnets 4a, 4b are disposed inside the cylindrical yoke 2 to face to each other. The cylindrical yoke 2 with the first and second magnets 4a, 4b are mounted on a rotary part. A circular arc angle α of the magnets is not larger than 180°. The first and second magnets 4a, 4b are magnetized in the N-pole and S-pole to face to each other. Two magnetic sensors 6a, 6b are mounted on a fixed part in the space (magnetic field) formed by the magnets 4a, 4b. The magnetic sensors are disposed at a position to detect the magnetic field in the tangential direction of a circle of the radius r. Here, the center of the circle coincides with the center O of the yoke 2. The centerline of the magnetic sensor 6a coincides with the centerline of the magnetic sensor 6b, and the centerlines of the magnetic sensors 6a, 6b pass through the center O. That is, the two magnetic sensors 6a, 6b are arranged with the angular spacing of 180° on the circle. And, the radius r is equal to or larger than half the outline width w of the magnetic sensors 6a, 6b.

Figure 2A:
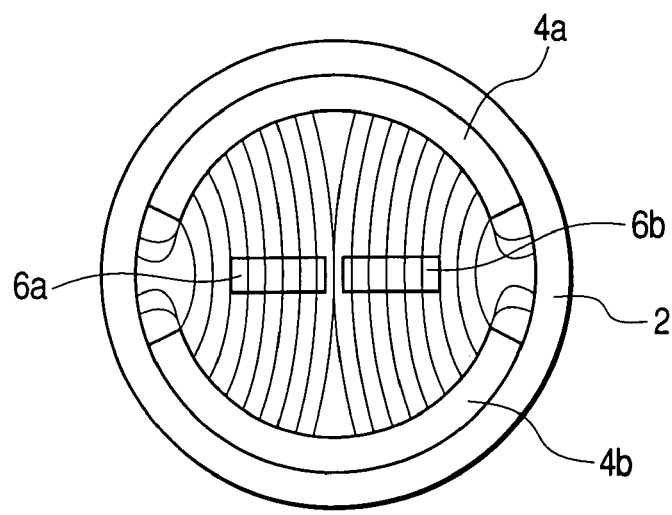
FIG. 2(a) through FIG. 2(c) illustrate the effects of the magnetic fields generated by the magnets of the magnetic rotary position sensor illustrated in FIG. 1.
Figure 2B:
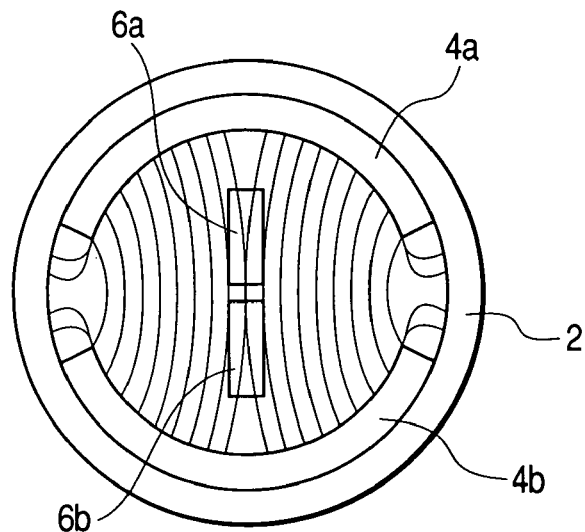
Figure 2C:
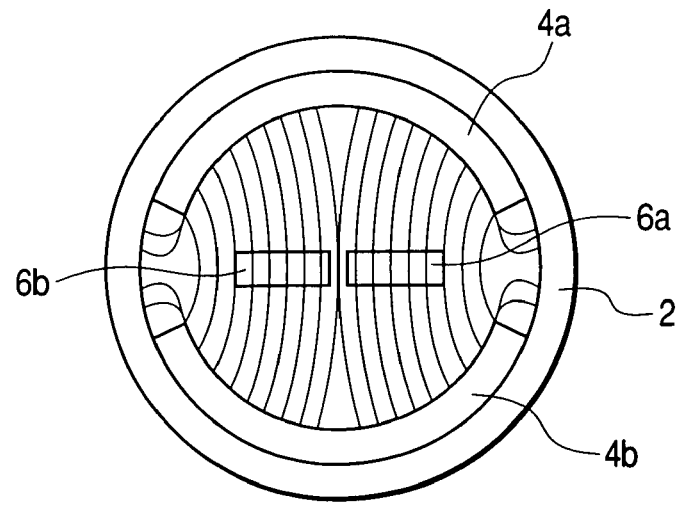

FIG. 2(a) through FIG. 2(c) illustrate the effects of the magnetic fields generated by the magnets of the magnetic rotary position sensor illustrated in FIG. 1. As shown in FIG. 2(a), the detected flux density of the magnetic sensor 6a is maximum (positive, maximum in the absolute value), when the line connecting the centers of the magnet 4a and the magnet 4b (longitudinal line on the drawing in FIG. 2) is perpendicular to the sensing faces of the magnetic sensors 6a, 6b (lateral line on the drawing in FIG. 2). When this state comes to the state as shown in FIG. 2(*b*), in which the magnets 4a, 4b rotate by 90° to the sensors 6a, 6b from the state as shown in FIG. 2(*a*), the detected flux density of the magnetic sensor 6a is zero. When the state as shown in FIG. 2(*b*) comes to the state as shown in FIG. 2 (*c*), in which the magnets 4a, 4b further rotate by 90° to the sensors 6a, 6b from the state as shown in FIG. 2(*b*), the detected flux density of the magnetic sensor 6a is minimum (negative, maximum in the absolute value). That is, in the state as shown in FIG. 2(*b*), there is not any flux component perpendicular to the sensing faces of the magnetic sensors 6a, 6b; and in the states as shown in FIGS. 2(*a*) and 2(*c*), the flux component perpendicular to the sensing faces of the magnetic sensors 6a, 6b becomes maximum. That is, by positively utilizing the character that the magnetic field inside the cylinder does not become parallel, but becomes slightly curved as it recedes from the center, the magnetic flux density Br of the position of the magnetic sensor 6a can be expressed by a linear approximation as follows.

$$Br = K \cdot \theta \quad (1)$$

Here, K is a constant determined by the structure of the magnetic circuit wherein the radius r and the circular arc angle α are appropriately determined. θ is the rotation angle that the magnetic sensor 6a forms to the magnets 4a, 4b (0° in the state shown in FIG. 2(*b*)).

And, assuming that the outer diameter of the yoke 2 is 20 mm, the inner diameter thereof is 17 mm, the thickness of the magnets 4a, 4b is 1.5 mm, and the radius r is 2-3 mm, especially 2.52 mm, the flux density of the magnetic sensors 6a, 6b varies linearly to the rotation angle θ over a wide range of the angle.

Figure 3A:
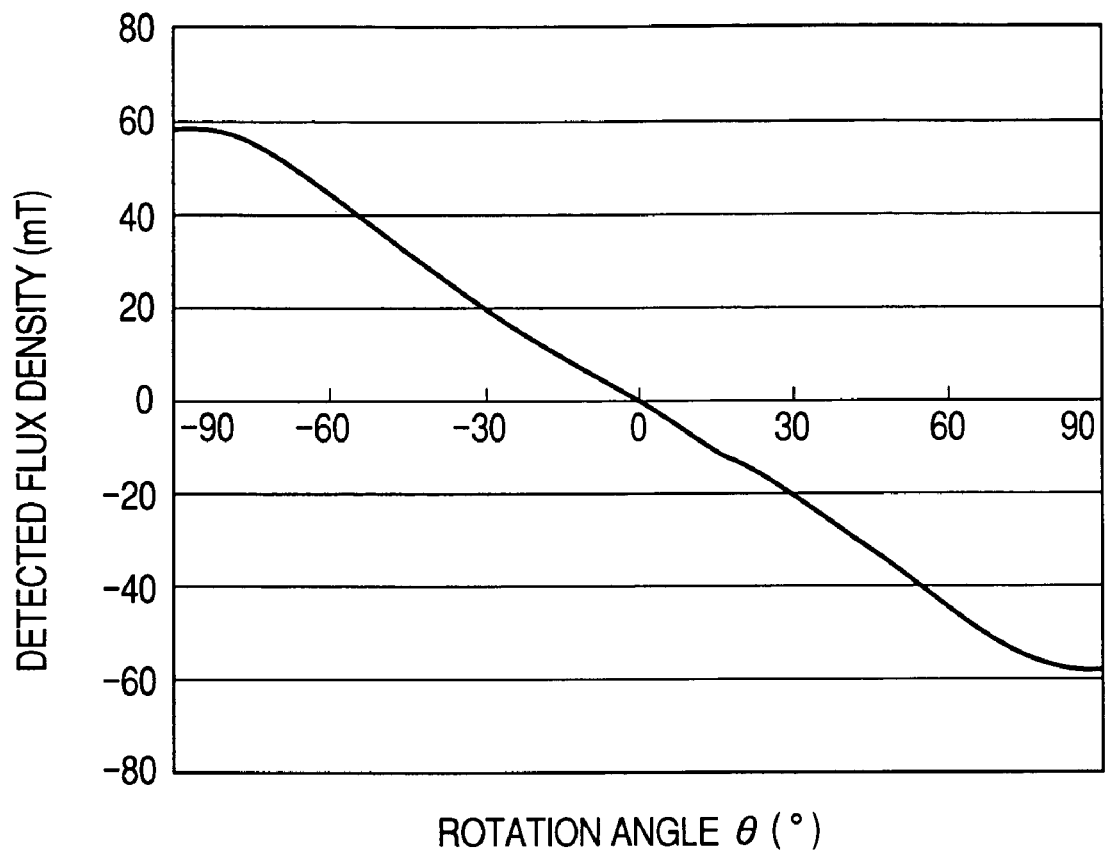
FIG. 3(a) illustrates the relation between the detected flux density and the rotation angle.
Figure 3B:
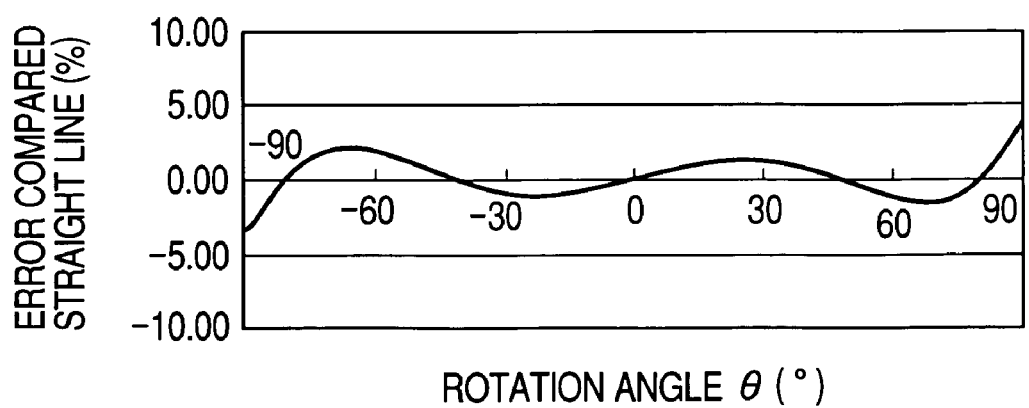
FIG. 3(b) illustrates the relation between the linearity error and the rotation angle, in the magnetic rotary position sensor illustrated in FIG. 1.

FIG. 3(*a*) is a graph illustrating the relation between the detected flux density and the rotation angle θ, when the circular arc angle α is 180°; FIG. 3(*b*) is a graph illustrating the relation between the linearity error (the error compared to the straight line) and the rotation angle θ, when the angle α is the same. These graphs clearly show that the linearity error is within ±2% when the rotation angle θ is within 120° in the central part, and that the error is about ±3% when the rotation angle θ is 180°,which shows a linear variation. In other words, if the error of about ±3% is permitted, these graphs will confirm that a magnetic rotary position sensor giving a linear output can be attained even when the rotation angle θ is 180°.

With regard to the application that requires a further decrease in the linearity error with the sacrifice that the rotation angle θ is narrowed, to decrease the circular angle α will improve the linearity in a narrow range of the rotation angle θ.

Figure 4A:
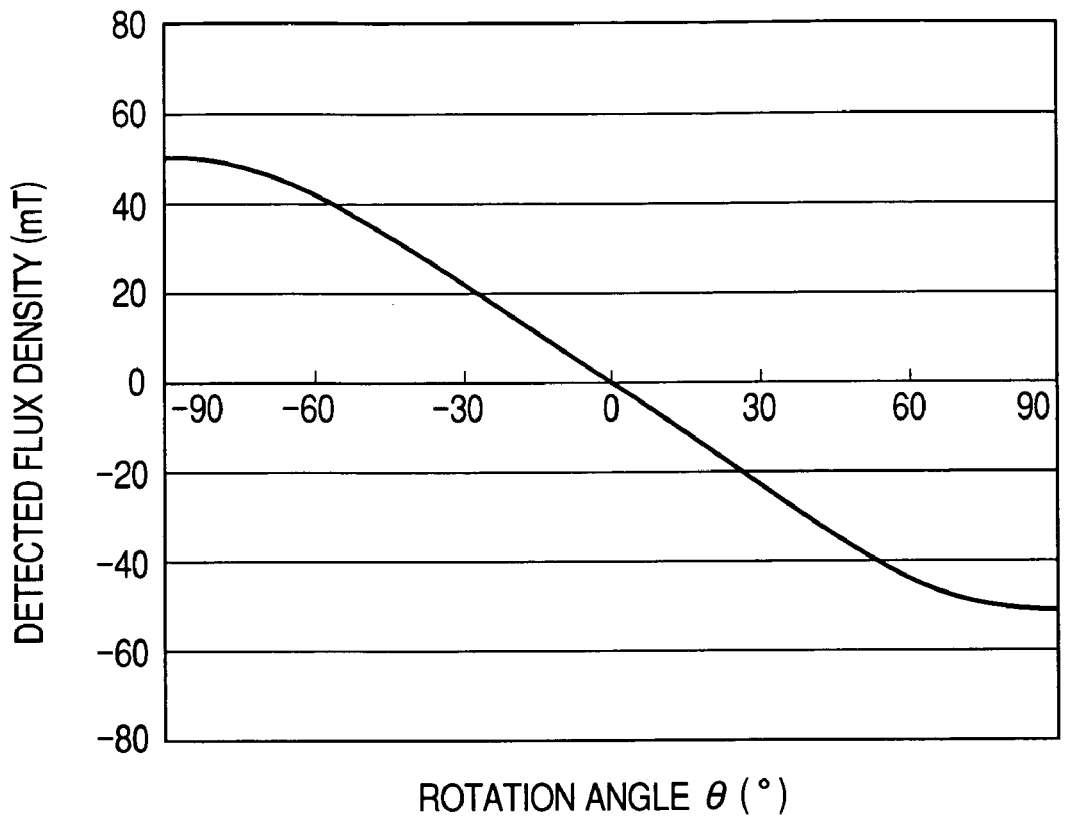
FIG. 4(a) illustrates another relation between the detected flux density and the rotation angle.
Figure 4B:
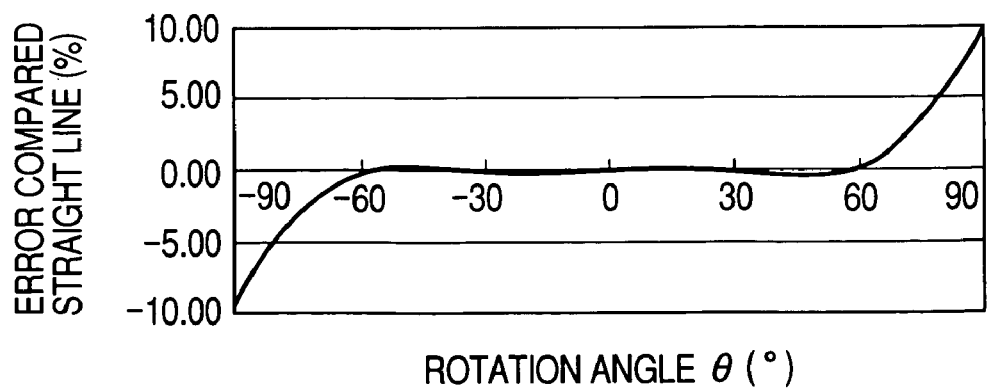
FIG. 4(b) illustrates another relation between the linearity error and the rotation angle, in the magnetic rotary position sensor illustrated in FIG. 1.

FIG. 4(*a*) is a graph illustrating another relation between the detected flux density and the rotation angle θ, when the circular arc angle α is 139°; FIG. 4(*b*) is a graph illustrating another relation between the linearity error and the rotation angle θ, when the angle α is the same. These graphs clearly show that the linearity error is improved within ±0.5% when the rotation angle θ is within 120° in the central part (30°–150°). However, when the rotation angle θ is 180° on both ends, the linearity error is increased to about 10% on the contrary. Therefore, this example is suitable for such an application that does not require a very large rotation angle θ.

Figure 5:
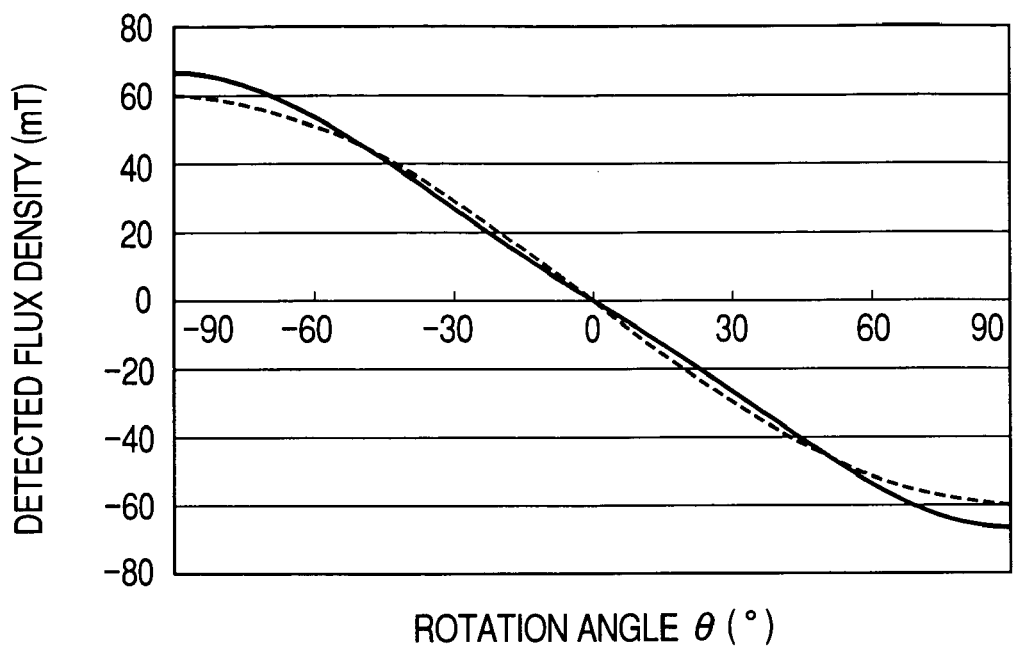
FIG. 5 illustrates the relation between the detected flux density and the rotation angle of the magnetic rotary position sensor.

FIG. 5 is a graph illustrating the relation between the detected flux density and the rotation angle θ, when the circular arc angle α is 139°, the radius r is 2.52 mm (solid line), and the radius r is 0 mm (dotted line). This graph clearly shows that to dispose the magnetic sensors 6a, 6b on the center (r=0 mm) will make the variation of the flux density sinusoidal, and to increase the radius r in contrast will expand the linear range of the center part.

Figure 6:
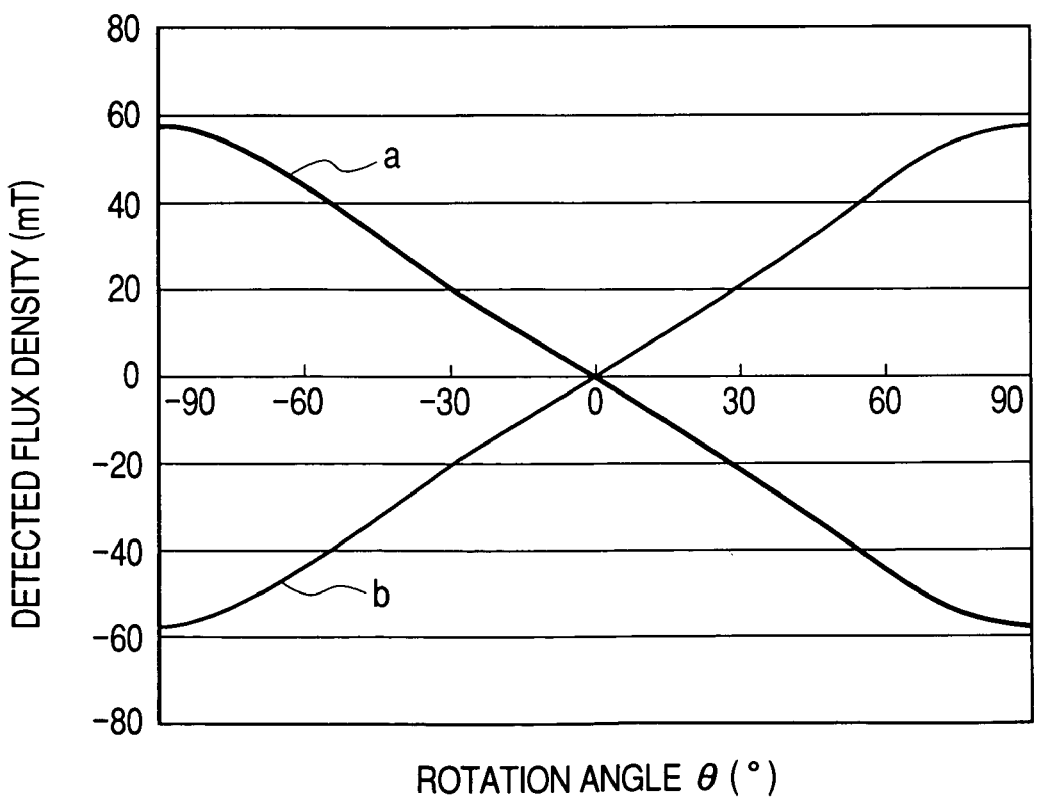
FIG. 6 illustrates the relation between the detected flux density and the rotation angle of both the magnetic sensors in the magnetic rotary position sensor illustrated in FIG. 1.

FIG. 6 is a graph illustrating the relation between the detected flux density and the rotation angle θ of both the magnetic sensors in the magnetic rotary position sensor illustrated in FIG. 1. Here, the line a shows the detected flux density of the magnetic sensor 6a, and the line b shows the detected flux density of the magnetic sensor 6b. As it is clearly shown in this graph, the variation of the detected flux density against the rotation angle θ in the line a is just reverse to the variation in the line b. Therefore, by monitoring that the sum of the outputs from the magnetic sensors 6a and 6b is constant, it will be possible to verify that the magnetic sensors 6a and 6b function normally.

Thus in the magnetic rotary position sensor illustrated in FIG. 1, the magnetic sensors 6a, 6b are disposed at a position to detect the magnetic field in the tangential direction of a circle in which the center of the circle coincides with the center of the yoke 2 and the radius r of the circle is equal to or larger than half the outline width w of the magnetic sensors 6a, 6b. Therefore, this magnetic rotary position sensor is capable of reducing the error of detection over a wide range of the rotation angle θ. Also, it does not contain a magnetic material in the space formed by the magnets 4a, 4b, and it will not generate the hysteresis accordingly. Further, since the two magnetic sensors 6a and 6b are disposed with the angular spacing of 180° on the circle, the sum of the magnetic sensors 6a and 6b is constant. Therefore, by monitoring the sum being constant, it is possible to verify that the magnetic sensors 6a and 6b function normally.

Figure 7:
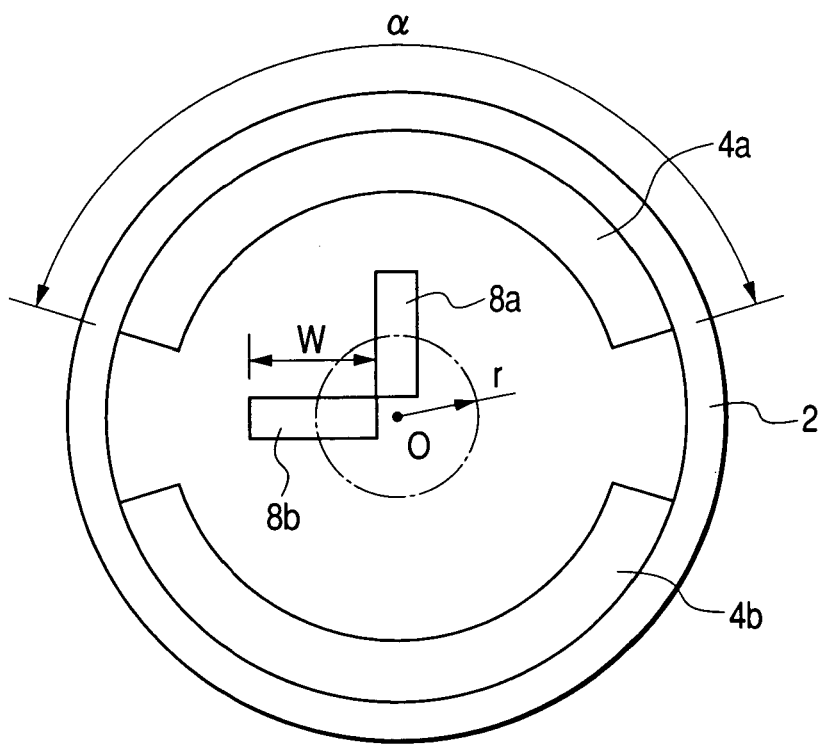
FIG. 7 illustrates another basic construction of the magnetic rotary position sensor of the present invention.

FIG. 7 illustrates another basic construction of the magnetic rotary position sensor of this invention. Two magnetic sensors 8a, 8b are provided in the space formed by the magnets 4a, 4b. The magnetic sensors 8a, 8b are disposed at a position to detect the magnetic field in the tangential direction of a circle of the radius r. Here, the center of the circle coincides with the center O of the yoke 2. The centerline of the magnetic sensor 8a intersects perpendicularly to the centerline of the magnetic sensor 8b, and the centerlines of the magnetic sensors 8a, 8b pass through the center O. That is, the two magnetic sensors 8a, 8b are arranged with the angular spacing of 90° on the circle. And, the radius r is equal to or larger than half the outline width w of the magnetic sensors 8a, 8b.

This magnetic rotary position sensor is capable of reducing the error of detection and expanding the detection range to 360°, by alternately using the outputs from the magnetic sensors 8a and 8b at every 90 degrees of the rotation angle θ, for example, by using the output from the magnetic sensor 8a when the rotation angle θ is within 45°–135°, and using the output from the magnetic sensor 8b when the rotation angle θ is within 135°–225°.

Figure 8:
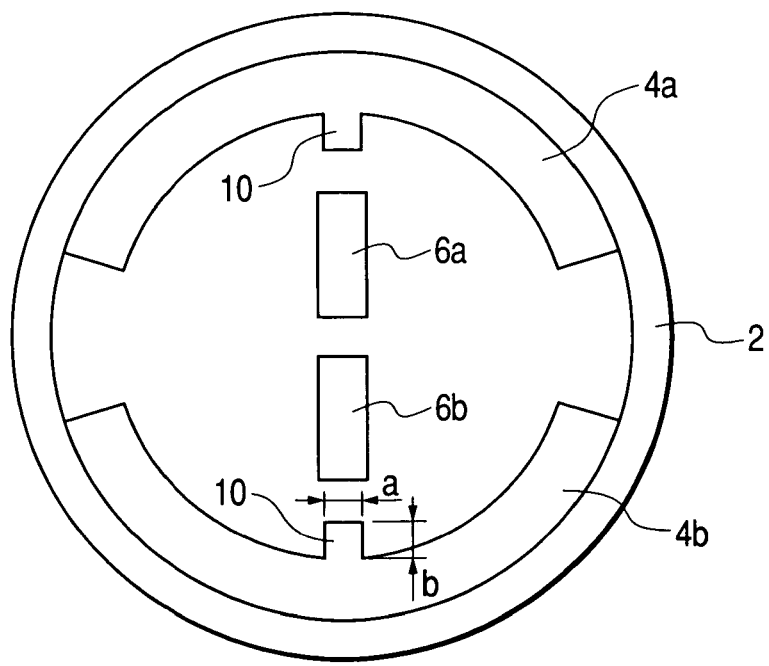
FIG. 8 illustrates another basic construction of the magnetic rotary position sensor of the present invention.

Another basic construction of the magnetic rotary position sensor of this invention will be described referring to FIG. 8. This construction provides rectangular projections 10, which are projected toward the insides of the magnets 4a, 4b on the centers of the circumferences thereof, which increase the magneto-motive forces (magnetic fluxes) on the centers of the circumferences of the magnets 4a, 4b.

In this magnetic rotary position sensor, the projections 10 are provided on the centers of the circumferences of the magnets 4a, 4b, and the magneto-motive forces are increased on the centers of the circumferences of the magnets 4a, 4b. Therefore, this magnetic rotary position sensor is capable of supplying deficient magnetic fluxes near the zero degrees of the rotation angle θ where the magnetic reluctance is high to hinder the magnetic fluxes from passing through. Accordingly, it is capable of increasing the absolute values of the magnetic fluxes that pass through the detection parts of the magnetic sensors 6a and 6b near the zero degrees of the rotation angle θ. Therefore, it is capable of approximating the curves showing the variations of the absolute values of the magnetic fluxes that pass through the detection parts of the magnetic sensors 6a and 6b to straight lines near the zero degrees of the rotation angle θ. Thus, this magnetic rotary position sensor is capable of reducing the linearity error in the detected flux density of the magnetic sensors 6a, 6b in the central part of the detection angle.

Figure 9:
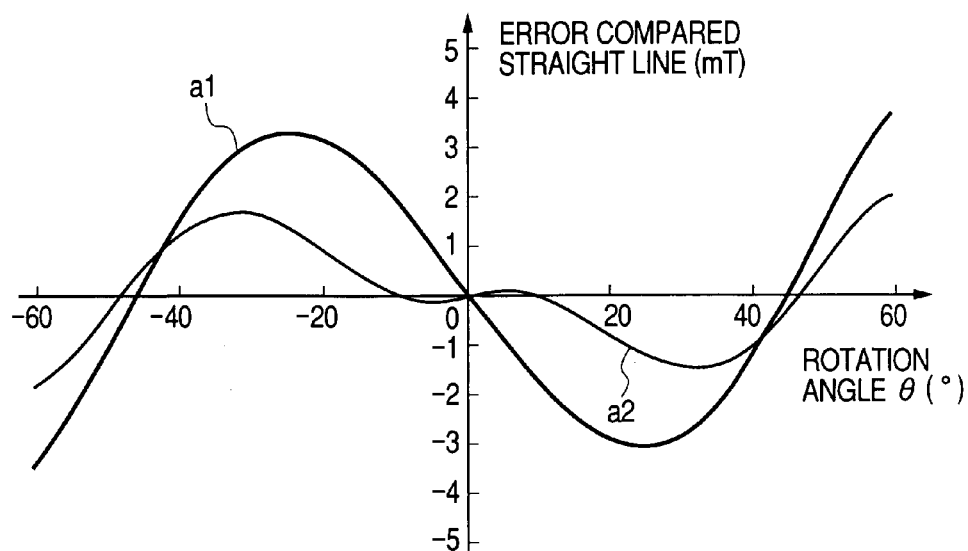
FIG. 9 illustrates the relation between the linearity error and the rotation angle in the magnetic rotary position sensor illustrated in FIG. 8.

FIG. 9 is a graph illustrating the relation between the linearity error and the rotation angle θ, in which the outer diameter of the yoke 2 is 20 mm, the inner diameter thereof is 15 mm, the thickness of the magnets 4a, 4b is 1.5 mm, the circular arc angle α is 143°, the distance between the centers of the magnetic sensors 6a, 6b and the center O of the yoke 2 is 2.72 mm, the breadth a of the projections 10 is 0.7 mm, and the radial length b thereof is 0.68 mm. In the drawing, the curve a1 shows the case of the magnetic rotary position sensor illustrated in FIG. 1, and the curve a2 shows the case of the magnetic rotary position sensor illustrated in FIG. 8. As it is clear from FIG. 9, the case with the projections 10 can reduce the linearity error in the detected flux density of the magnetic sensors 6a, 6b in the central part of the detection angle, as compared with the case without the projections 10.

Figure 10:
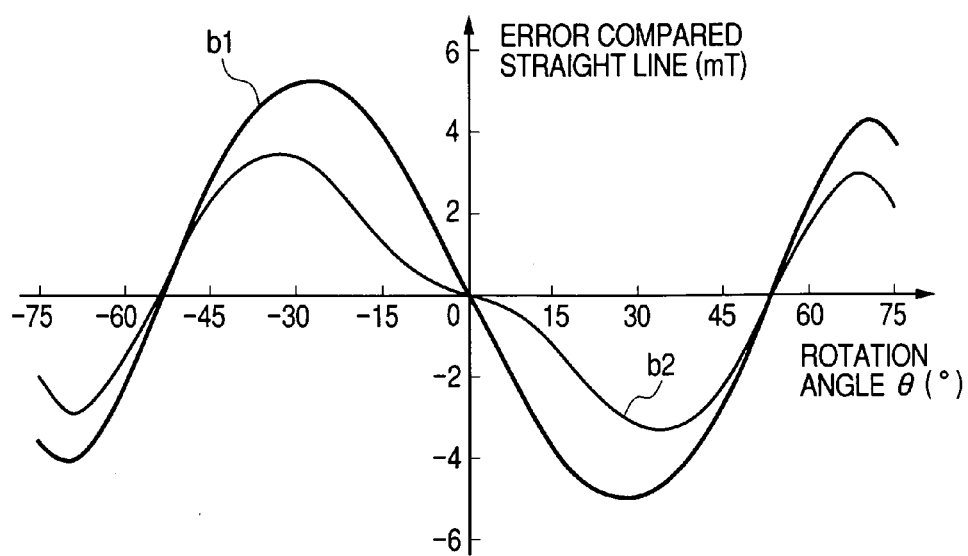
FIG. 10 illustrates another relation between the linearity error and the rotation angle in the magnetic rotary position sensor illustrated in FIG. 8.

FIG. 10 is a graph illustrating the relation between the linearity error and the rotation angle θ, in which the circular arc angle α is 166°, and the other dimensions are the same as the case in FIG. 9. In the drawing, the curve b1 shows the case of the magnetic rotary position sensor illustrated in FIG. 1, and the curve b2 shows the case of the magnetic rotary position sensor illustrated in FIG. 8. And, as it is clear from FIG. 10, even in case of increasing the circular arc angle α and expanding the range of the detection angle, the case with the projections 10 can reduce the linearity error in the detected flux density of the magnetic sensors 6a, 6b in the central part of the detection angle, as compared with the case without the projections 10.

Figure 11:
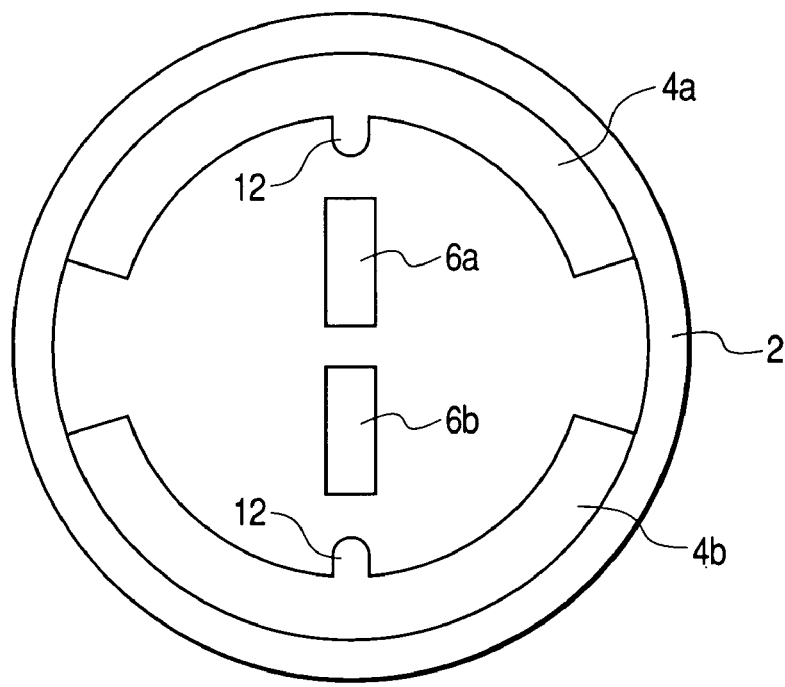
FIG. 11 illustrates another basic construction of the magnetic rotary position sensor of the present invention.

FIG. 11 illustrates another basic construction of the magnetic rotary position sensor of this invention. As shown in the drawing, round projections 12 are provided, which are projected toward the insides of the magnets 4a, 4b on the centers of the circumferences thereof. Thereby, the magneto-motive forces are reinforced on the centers of the circumferences of the magnets 4a, 4b.

Figure 12:
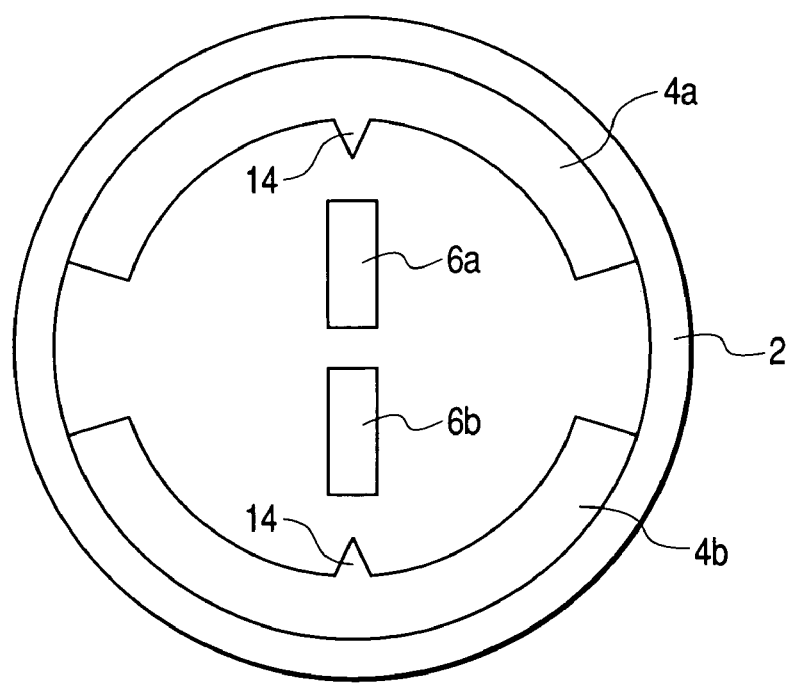
FIG. 12 illustrates another basic construction of the magnetic rotary position sensor of the present invention.

FIG. 12 illustrates another basic construction of the magnetic rotary position sensor of this invention. As shown in the drawing, V-letter projections 14 are provided, which are projected toward the insides of the magnets 4a, 4b on the centers of the circumferences thereof. Thereby, the magneto-motive forces are reinforced on the centers of the circumferences of the magnets 4a, 4b.

In these cases illustrated in FIG. 11 and FIG. 12, the magnetic rotary position sensor includes the round projections 12 or the V-letter projections 14 on the centers of the circumferences of the magnets 4a, 4b, which increase the magneto-motive forces on the centers of the circumferences of the magnets 4a, 4b. Therefore, these cases can also reduce the linearity error in the detected flux density of the magnetic sensors 6a, 6b in the central part of the detection angle.

In the above embodiments, the magnets 4a, 4b are provided with the rectangular projections 10, round projections 12, or V-letter projections 14; however, the projections may be formed in the other shapes.

Figure 13A:
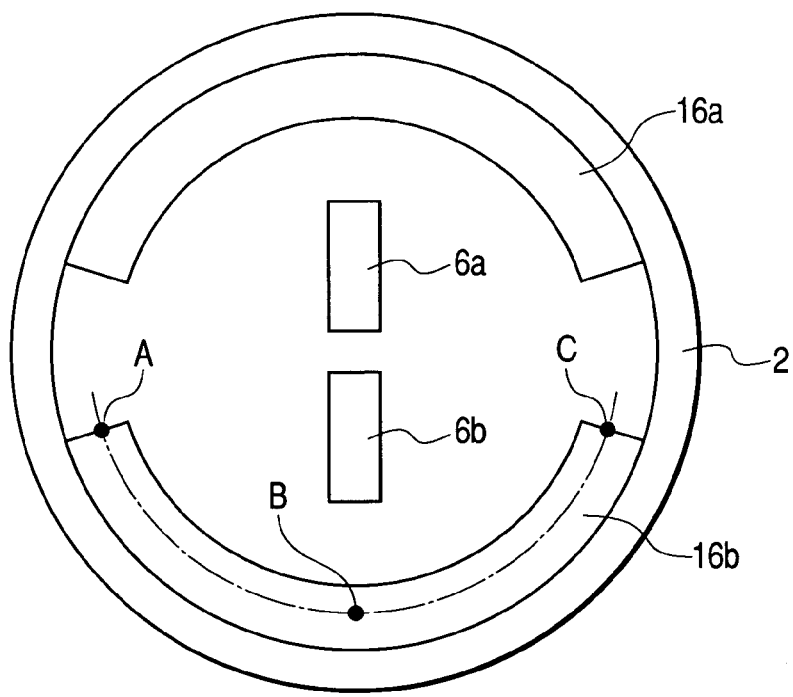
FIG. 13(a) illustrates another basic construction of the magnetic rotary position sensor of the present invention.
Figure 13B:
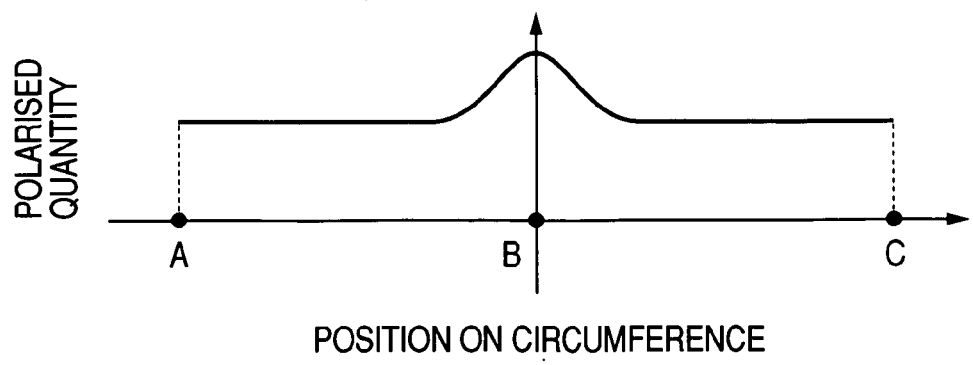
FIG. 13(b) illustrates the relation between the magnetized quantity and the position on circumference.

FIG. 13(a) illustrates another basic construction of the magnetic rotary position sensor of the present invention, and FIG. 13(b) illustrates the relation between the magnetized quantity and the position on the circumference of the magnet 16b (16a). The positions A through C in FIG. 13(b) correspond respectively to the positions A through C in FIG. 13(a). As shown in the drawing, the semi-cylindrical first and second magnets 16a, 16b are disposed to face to each other inside the cylindrical yoke 2. The magnets 16a, 16b are magnetized in a manner that the N-pole and S-pole face to each other. The magnetic sensors 6a, 6b are placed in the space formed by the magnets 16a, 16b. The magnetized quantities on the centers of the circumferences of the magnets 16a, 16b are increased, and the magneto-motive forces on the centers of the circumferences of the magnets 16a, 16b are increased.

The magnetic rotary position sensor illustrated in FIG. 13 increases the magnetized quantities on the centers of the circumferences of the magnets 16a, 16b and accordingly the magneto-motive forces on the centers of the circumferences of the magnets 16a, 16b. Therefore, this case can also reduce the linearity error in the detected flux density of the magnetic sensors 6a, 6b in the central part of the detection angle.

Here in this embodiment, the magnetized quantities are varied as shown in FIG. 13(b), however the magneto-motive forces may be increased on the centers of the circumferences of the first and second magnets.

Figure 14:
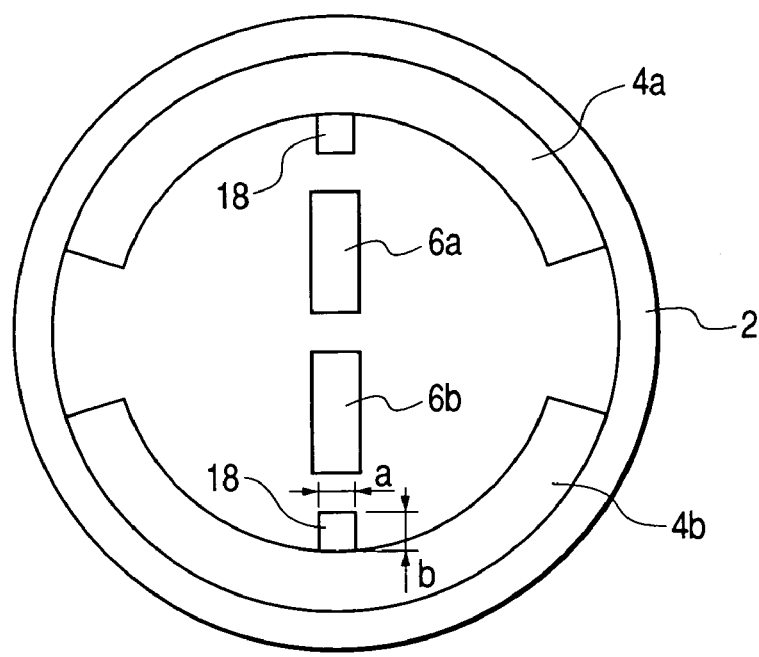
FIG. 14 illustrates another basic construction of the magnetic rotary position sensor of the present invention.

Another basic construction of the magnetic rotary position sensor of the present invention will be described referring to FIG. 14. This construction includes rectangular magnetic material pieces 18 projecting toward the insides of the magnets 4a, 4b on the centers of the circumferences thereof, which increase the magnetic permeability on the centers of the circumferences of the magnets 4a, 4b.

In this magnetic rotary position sensor, the magnetic material pieces 18 are disposed on the centers of the circumferences of the magnets 4a, 4b, and the magnetic permeability are increased on the centers of the circumferences of the magnets 4a, 4b, and the magnetic reluctances become decreased. Therefore, this magnetic rotary position sensor is capable of supplying deficient magnetic fluxes near the zero degrees of the rotation angle θ where the construction illustrated in FIG. 1 is apt to deter the magnetic fluxes from passing through. Therefore, it is capable of increasing the absolute values of the magnetic fluxes that pass through the detection parts of the magnetic sensors 6a and 6b near the zero degrees of the rotation angle θ. Accordingly, it is capable of approximating the curves showing the variations of the absolute values of the magnetic fluxes that pass through the detection parts of the magnetic sensors 6a and 6b to straight lines near the zero degrees of the rotation angle θ. Thus, the magnetic rotary position sensor is capable of reducing the linearity error in the detected flux density of the magnetic sensors 6a, 6b in the central part of the detection angle. Besides, it is not necessary to specialize the shape and the distribution of magnetization of the magnets 4a, 4b, which saves manufacturing the dedicated mold and magnetizing yoke, etc.; since it is possible to use sheet formed magnets, for example, the manufacturing time is shortened to lower the manufacturing cost. Further, to appropriately determine the shape and disposition of the magnetic material pieces 18 will achieve a reduction of the linearity error by adjusting the magnetic permeability. Accordingly, it is possible to dispose the magnetic material pieces 18 while observing the linearity of the output voltage in the same manner as the trimming practiced in the contact type position sensor (trimming: processing the resistor of the contact type position sensor so as to enhance the linearity of the output voltage), also to easily perform the shape processing of the magnetic material pieces 18.

Figure 15:
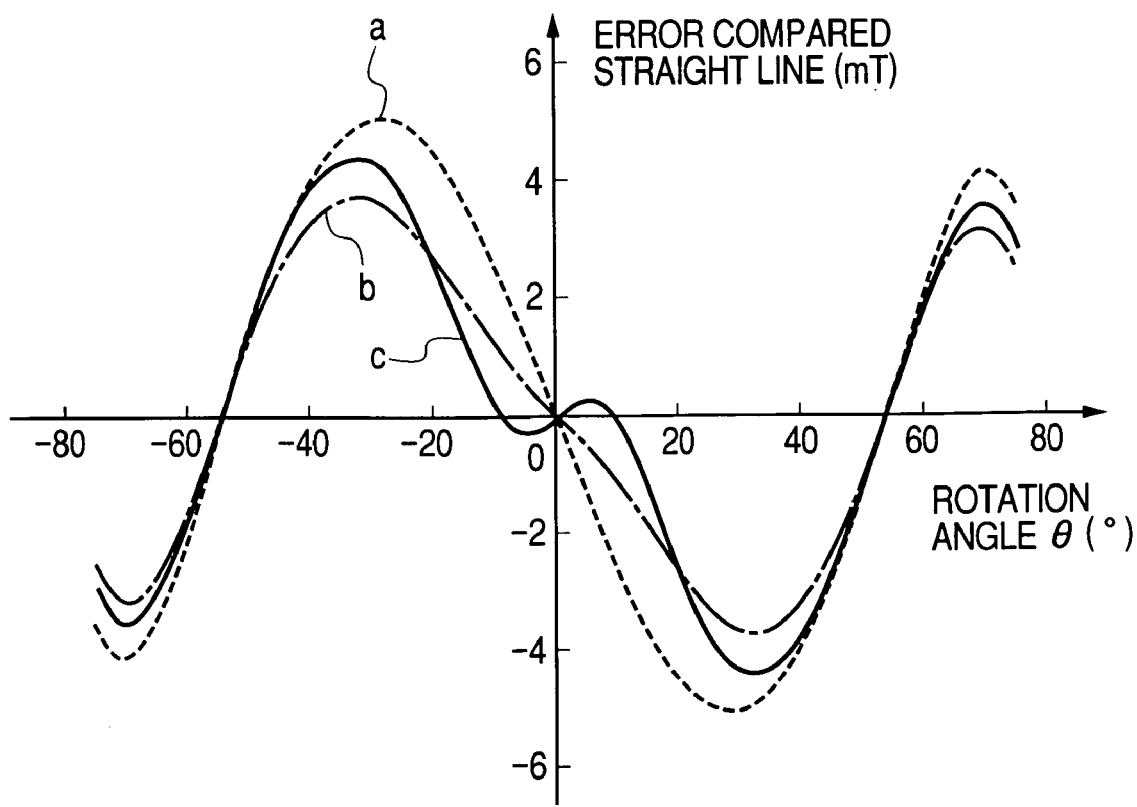
FIG. 15 illustrates the relation between the linearity error and the rotation angle in the magnetic rotary position sensor illustrated in FIG. 14.

FIG. 15 is a graph illustrating the relation between the linearity error and the rotation angle θ, in which the outer diameter of the yoke 2 is 20 mm, the inner diameter thereof is 15 mm, the thickness of the magnets 4a, 4b is 2 mm, the circular arc angle α is 166°, the distance between the centers of the magnetic sensors 6a, 6b and the center O of the yoke 2 is 2.72 mm, the width a of the projections 10 is 0.5 mm, the radial length b thereof is 0.7 mm, the breadth a of the magnetic material pieces 18 is 0.7 mm, and the radial length b thereof is 0.68 m. In the drawing, the curve a shows the case of the magnetic rotary position sensor illustrated in FIG. 1, the curve b shows the case of the magnetic rotary position sensor illustrated in FIG. 8, and the curve c shows the case of the magnetic rotary position sensor illustrated in FIG. 14. As it is clear from FIG. 15, the case with the magnetic material pieces 18 disposed can reduce the linearity error in the detected flux density of the magnetic sensors 6a, 6b in the central part of the detection angle, as compared with the case without the magnetic material pieces 18 disposed. And, the case with the magnetic material pieces 18 disposed can reduce the linearity error in the detected flux density of the magnetic sensors 6a, 6b near the zero degrees (−20°–+20°) of the rotation angle θ, as compared to the case with the projections 10.

Figure 16:
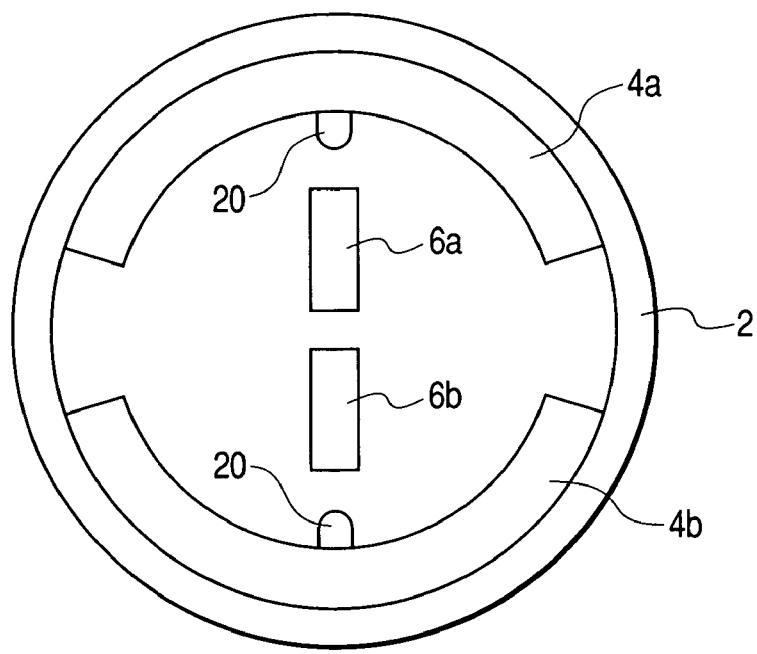
FIG. 16 illustrates another basic construction of the magnetic rotary position sensor of the present invention.

FIG. 16 illustrates another basic construction of the magnetic rotary position sensor of this invention. As shown in the drawing, the construction includes round magnetic material pieces 20 projecting toward the insides of the magnets 4a, 4b on the centers of the circumferences thereof, which increase the magnetic permeability on the centers of the circumferences of the magnets 4a, 4b.

Figure 17:
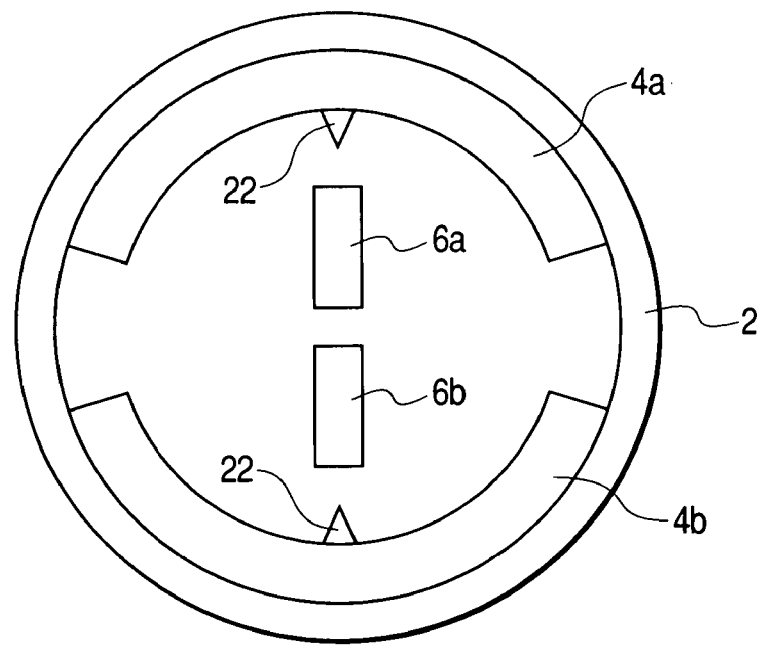
FIG. 17 illustrates another basic construction of the magnetic rotary position sensor of the present invention.

FIG. 17 illustrates another basic construction of the magnetic rotary position sensor of this invention. As shown in the drawing, the construction includes V-letter magnetic material pieces 22 projecting toward the insides of the magnets 4a, 4b on the centers of the circumferences thereof, which increase the magnetic permeability on the centers of the circumferences of the magnets 4a, 4b.

In these cases illustrated in FIG. 16 and FIG. 17, the magnetic rotary position sensor includes the round magnetic material pieces 20 or the V-letter magnetic material pieces 22 on the centers of the circumferences of the magnets 4a, 4b, which increase the magnetic permeability on the centers of the circumferences of the magnets 4a, 4b. Therefore, these cases can also reduce the linearity error in the detected flux density of the magnetic sensors 6a, 6b in the central part of the detection angle. Further, it is not necessary to manufacture the dedicated mold and polarizing yoke, etc., which shortens the manufacturing time and lowers the manufacturing cost.

In the above embodiments, the rectangular magnetic material pieces 18, round magnetic material pieces 20, and V-letter magnetic material pieces 22 are used in the magnetic material pieces, however the other shapes may be used in the magnetic material pieces.

The magneto-electric transducer such as the Hall-effect sensor, magnetic reluctance sensor, or MI (magneto-impedance) sensor can be used for the magnetic sensors 6a, 6b and the magnetic sensors 8a, 8b. And, a programmable Hall IC is already developed for this kind of application, which integrates a Hall element used in a flux-sensing part, AD converter, DSP, and DA converter and so forth into one unit. This IC includes the gain adjustment function that determines the relation between the magnetic flux density and the output voltage, the function that changes the polarity of the magnetic field and the polarity of the output voltage, and the temperature compensation function that cancels the variations of the magnetic characteristic of the magnets depending on the temperature variations, etc., and all these functions are made programmable, which is most usable at present. Using this IC, the gain setting and the temperature compensation of the magnets can easily be carried out.

As mentioned above, the magnetic circuit as the concrete example uses the yoke 2 having the outer diameter of 20 mm and the inner diameter of 17 mm, and the magnets 4a, 4b having the thickness of 1.5 mm; and the sheet formed magnets are suitable for the magnets 4a, 4b with such a simple shape and thinness. It is possible to manufacture the sheet formed magnets having the thickness of about 0.5 mm, and also possible to easily cut out the sensor magnets from a uniformly thin rolled sheet, which saves an expensive die to manufacture the magnetic rotary position sensor at a low cost. The sheet formed type of the SmFeN rare earth bonded magnet has a low temperature coefficient and a high heat resistance as 150° C., and applying the position sensor using this material to automobiles and the like will produce the optimum result.

In order to vary the relative angle between the magnetic sensors 6a, 6b and the magnets 4a, 4b, and the relative angle between the magnetic sensors 8a, 8b and the magnets 4a, 4b, it is a common exercise to fix the magnetic sensors 6a, 6b and the magnetic sensors 8a, 8b, and to couple the magnets 4a, 4b to a revolving shaft and input the rotation angle θ. However, to fix the magnets 4a, 4b and rotate the magnetic sensors 6a, 6b and the magnetic sensors 8a, 8b will not produce any inconveniences.

In the above embodiments, the two magnetic sensors 6a and 6b are disposed with the angular spacing of 180° on the circle; however, n-pieces of magneto-electric transducers may be disposed with the angular spacing of 360°/n. This arrangement will easily attain a multi-phase output.

What is claimed is:

1. A magnetic rotary position sensor comprising:
    a cylindrical yoke;
    semi-cylindrical first and second magnets disposed on the inside of the yoke to face to each other, which are magnetized in a manner that the N-pole and S-pole face to each other; and
    magneto-electric transducers disposed in a circle in the magnetic field generated by the first and second magnets, rotating against the first and second magnets, which are disposed at a position to detect the magnetic field in a tangential direction of said circle in which the center of said circle coincides with the center of the yoke and the radius of said circle is equal to or larger than half the outline width of the magneto-electric transducers.

2. A magnetic rotary position sensor according to claim 1, wherein n-pieces of the magneto-electric transducers are disposed with the angular spacing of 360°/n on said circle.

3. A magnetic rotary position sensor according to claim 2, wherein two-pieces of the magneto-electric transducers are disposed with the angular spacing of 180° on said circle.

4. A magnetic rotary position sensor according to claim 1, wherein two-pieces of the magneto-electric transducers are disposed with the angular spacing of 90° on said circle.

5. A magnetic rotary position sensor according to claim 1, wherein a programmable Hall IC is used as the magneto-electric transducers.

6. A magnetic rotary position sensor according to claim 1, wherein a sheet formed magnet is used as the first and second magnets.

7. A magnetic rotary position sensor according to claim 6, wherein the sheet formed type of the SmFeN rare earth bonded magnet is used as the first and second magnets.

8. A magnetic rotary position sensor according to claim 1, wherein magneto-motive forces are increased on the centers of the circumferences of the first and second magnets.

9. A magnetic rotary position sensor according to claim 8, wherein projections are provided on the centers of the circumferences of the first and second magnets.

10. A magnetic rotary position sensor according to claim 8, wherein magnetized quantities are increased on the centers of the circumferences of the first and second magnets.

11. A magnetic rotary position sensor according to claim 1, wherein magnetic permeability are increased on the centers of the circumferences of the first and second magnets.

12. A magnetic rotary position sensor according to claim 11, wherein magnetic material pieces are disposed on the centers of the circumferences of the first and second magnets.

* * * * *